(12) United States Patent
Kawamura

(10) Patent No.: US 7,200,426 B2
(45) Date of Patent: Apr. 3, 2007

(54) FOLDING CELLULAR TELEPHONE

(75) Inventor: Kenji Kawamura, Tokyo (JP)

(73) Assignee: NEC Corporation, Tokyo (JP)

( * ) Notice: Subject to any disclaimer, the term of this patent is extended or adjusted under 35 U.S.C. 154(b) by 247 days.

(21) Appl. No.: 10/900,288

(22) Filed: Jul. 28, 2004

(65) Prior Publication Data

US 2005/0026652 A1 Feb. 3, 2005

(30) Foreign Application Priority Data

Jul. 29, 2003 (JP) ............................. 2003-282098

(51) Int. Cl.
*H04Q 7/20* (2006.01)
(52) U.S. Cl. ............................... 455/573.3; 455/571.1; 455/575.4
(58) Field of Classification Search ............. 455/575.1, 455/575.3, 575.8, 566, 90.3, 556.2; 379/433.07–13, 379/433.04; 345/156, 158, 166, 169, 214
See application file for complete search history.

(56) References Cited

U.S. PATENT DOCUMENTS

| | | | |
|---|---|---|---|
| 5,657,370 A * | 8/1997 | Tsugane et al. .............. | 455/566 |
| 6,643,124 B1 * | 11/2003 | Wilk ........................... | 361/681 |
| 6,898,073 B2 * | 5/2005 | Lin ............................. | 361/679 |
| 6,931,265 B2 * | 8/2005 | Reyes et al. ................. | 455/566 |
| 6,983,175 B2 * | 1/2006 | Kwon ........................ | 455/575.1 |
| 2004/0209641 A1 * | 10/2004 | Hong ....................... | 455/550.1 |
| 2005/0159194 A1 * | 7/2005 | Heintz et al. ............. | 455/575.3 |

FOREIGN PATENT DOCUMENTS

| | | |
|---|---|---|
| JP | 2001-175609 | 6/2001 |
| JP | 2001-358811 | 12/2001 |
| JP | 2002-176476 | 6/2002 |

* cited by examiner

*Primary Examiner*—Jean Gelin
(74) *Attorney, Agent, or Firm*—Whitham, Curtis, Christofferson & Cook, PC

(57) ABSTRACT

A folding cellular telephone which also functions as an information terminal, enabling an improvement in the usability of both the telephone function and the information terminal function as well as a reduction in electric power consumption for the use of the telephone function. A folding cellular telephone comprising a first housing, a second housing and a cover, which are connected with each other by a hinge section formed of a single hinge axis so that they can rotate on the hinge axis. A set of first operation keys for using the information terminal function are disposed on the inner surface of the first housing, and a large first display section for using the information terminal function is disposed on the inner surface of the second housing. A set of second operation keys, a small second display section, and a speaker for using the telephone function are disposed on the outer surface of the second housing in the order named from the vicinity of the hinge section. The cover protects the second operation keys for using the telephone function when the folding cellular telephone is folded, and a microphone is disposed on the inner surface of the cover.

11 Claims, 6 Drawing Sheets

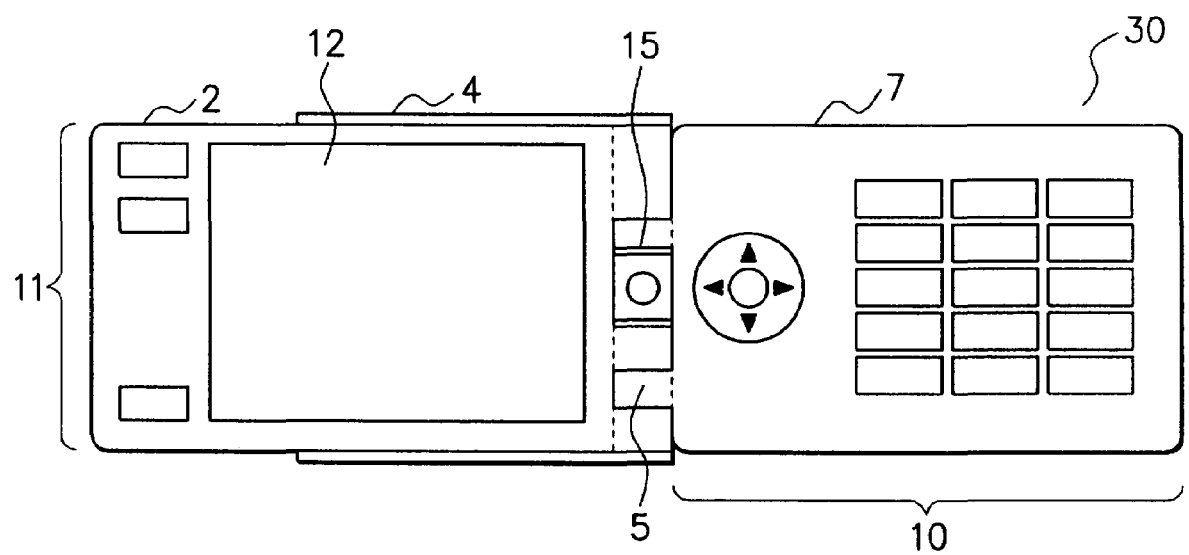
F I G. 6

FOLDING CELLULAR TELEPHONE

FIELD OF THE INVENTION

The present invention relates to a folding cellular telephone, and in more particular, to a folding cellular telephone which also functions as an information terminal for sending/receiving e-mail messages, viewing Web sites on the Internet, playing games, and the like.

BACKGROUND OF THE INVENTION

Folding cellular telephones, which have prevailed in recent years, each comprise a first housing having a speaker and a display section (liquid crystal display), a second housing having a microphone and an operating section such as input keys, and a hinge section for rotatably connecting the first housing with the second housing. Such folding cellular telephone is folded when not being used so as to be portable or suitable for carrying around. In using the folding cellular telephone, a user rotates the first and/or second housings on the hinge section as the axis of rotation to unfolded (opened) positions so that he/she can operate the keys while viewing the display section or have a conversation by the telephone through the speaker and microphone.

Each of the housings has certain degree of weight since it is provided with a built-in electronic circuit board, a liquid crystal display (LCD), a battery and the like. Therefore, a spring or the like is incorporated in the hinge section as a supporting mechanism that makes the upper side housing flip up to help the user unfold the cellular telephone. The folding cellular telephone is also provided with a mechanism for preventing the telephone from being easily refolded. Besides, some folding cellular telephones have a mechanism by which the hinge supports the first and second housings for movement in the folding (closing) direction if the angle between the housings decreases on the occasion when the telephone is folded. As just described, the conventional folding cellular telephone adopts complicated open-close mechanisms so that the user can fold/unfold the telephone with only one hand when using the telephone.

In addition, more and more folding cellular telephones function as information terminals for sending/receiving e-mail messages, viewing Web sites on the Internet, playing games and the like as described in, for example, Japanese Patent Application laid open No. 2001-175609, Japanese Patent Application laid open No. 2001-358811 and Japanese Patent Application laid open No. 2002-176476. Accordingly, the size of the display section (LCD) tends to increase. Further, some folding cellular telephones are provided with a plurality of display sections. As an example, a small display is arranged on the back surface of the first housing for indicating simple information such as time, the telephone number of a calling party on receipt of a phone call, and the like so that the user can obtain the information even while the folding cellular telephone is folded.

In the case of using the original telephone functions of such folding cellular telephone that serves as an information terminal for sending/receiving e-mail messages, viewing Web sites on the Internet, playing games and the like, generally, the first and/or second housings are rotated to opened positions. Thereby, the user inputs the telephone number of the other party through the operating section such as input keys, and subsequently, checks the telephone number of the other party shown on the display, thus making a call to his/her party. After the connection is established, the user has a conversation with his/her party by the folding cellular telephone through the speaker and microphone placed on the edges of the respective housings. On this occasion, the folding cellular telephone consumes a measurable amount of electric power, if only temporarily, since the large display set on the inner surface of the housing displays information and also its backlight turns on.

There is disclosed a folding cellular telephone which is capable of serving the telephone functions regardless of whether or not it is folded in Japanese Patent Application laid open No. 2002-176476. The folding cellular telephone needs universal coupling joints for different rotation between its housings as a horizontal axis X for opening/closing movement and a vertical axis Y for front/back side-inverting movement, which run at right angles to one another. Consequently, the hinge section has a complex structure. Moreover, since part of information displayed on the large display set on the inner surface of the housing is viewed through a see-through window, the display requires more electric power.

Furthermore, input keys of the conventional folding cellular telephone are used for the information terminal functions such as for sending/receiving e-mail messages as well as the telephone functions. Therefore, in addition to numerals, alphabetic or other characters and the like are printed on the operation buttons or keys, and the user would have trouble seeing anything printed on the operation buttons when operating them.

SUMMARY OF THE INVENTION

It is therefore an object of the present invention to provide a folding cellular telephone, which also functions as an information terminal for sending/receiving e-mail messages, viewing Web sites on the Internet, playing games, and the like, enabling an improvement in the usability of both the telephone functions and the information terminal functions as well as a reduction in electric power consumption on the occasion when its telephone functions are used.

It is another object of the present invention to provide a method for realizing the folding cellular telephone having the functions mentioned above with more simple construction.

In accordance with an aspect of the present invention, to achieve the objects above, there is provided a folding cellular telephone which functions as an information terminal for sending/receiving e-mail messages, viewing Web sites on the Internet and playing games, comprising a hinge section formed of a single hinge axis, and two types of open-close parts capable of individual opening and closing movements around the hinge section as the center, wherein telephone functions are available when one of the open-close parts is open, while information terminal functions are available when the other open-close part is open.

More specifically, the folding cellular telephone which functions as an information terminal for sending/receiving e-mail messages, viewing Web sites on the Internet and playing games, comprising a first housing, a second housing and a cover, which are connected with each other by the hinge section formed of a single hinge axis so that they can rotate on the hinge axis, wherein first operation keys for using the information terminal functions are disposed on one surface of the first housing, on the inside when the folding cellular telephone is folded; a large first display section for using the information terminal functions is disposed on one surface of the second housing, opposite the aforementioned one surface of the first housing when the folding cellular telephone is folded; second operation keys, a small second display section, and a speaker for using the telephone functions are disposed on the other surface of the second housing in the order named from the vicinity of the hinge section; the cover protects the second operation keys disposed on the other surface of the second housing, on the outside when the folding cellular telephone is folded; and a microphone is disposed on one surface of the cover, on the inside when the folding cellular telephone is folded.

BRIEF DESCRIPTION OF THE DRAWINGS

The objects and features of the present invention will become more apparent from the consideration of the following detailed description taken in conjunction with the accompanying drawings in which:

FIG. 6 is a diagram showing a folding cellular telephone according to the third embodiment of the present invention.

DESCRIPTION OF THE PREFERRED EMBODIMENTS

Figure 1:
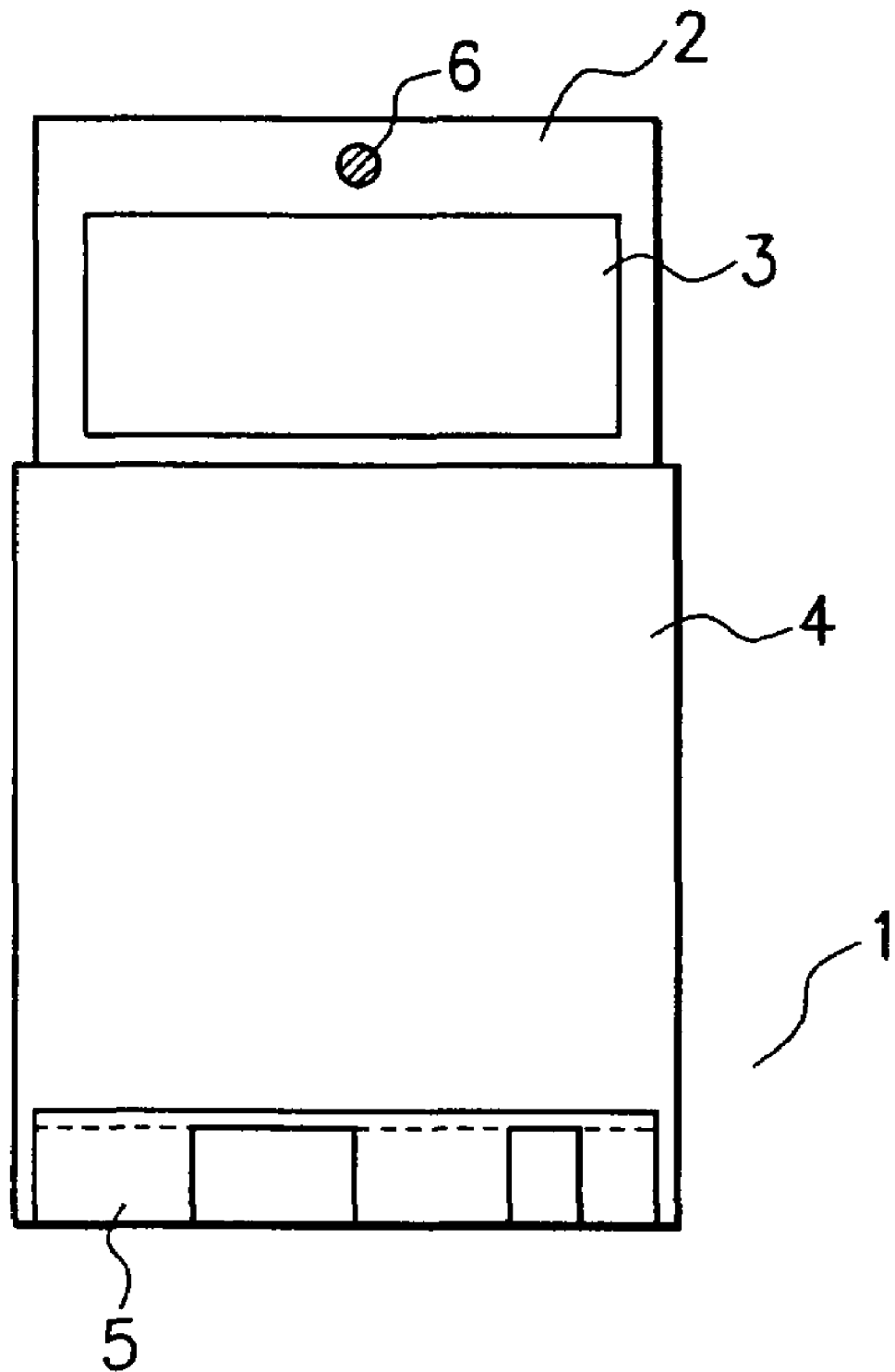
FIG. 1 is a diagram showing a front view of a folding cellular telephone according to the first embodiment of the present invention in the folded state viewed from the side of a small display set on the outer surface of a housing.

Referring now to the drawings, a description of preferred embodiments of the present invention will be given in detail. Like reference numerals refer to corresponding parts throughout the drawings.

Figure 2:
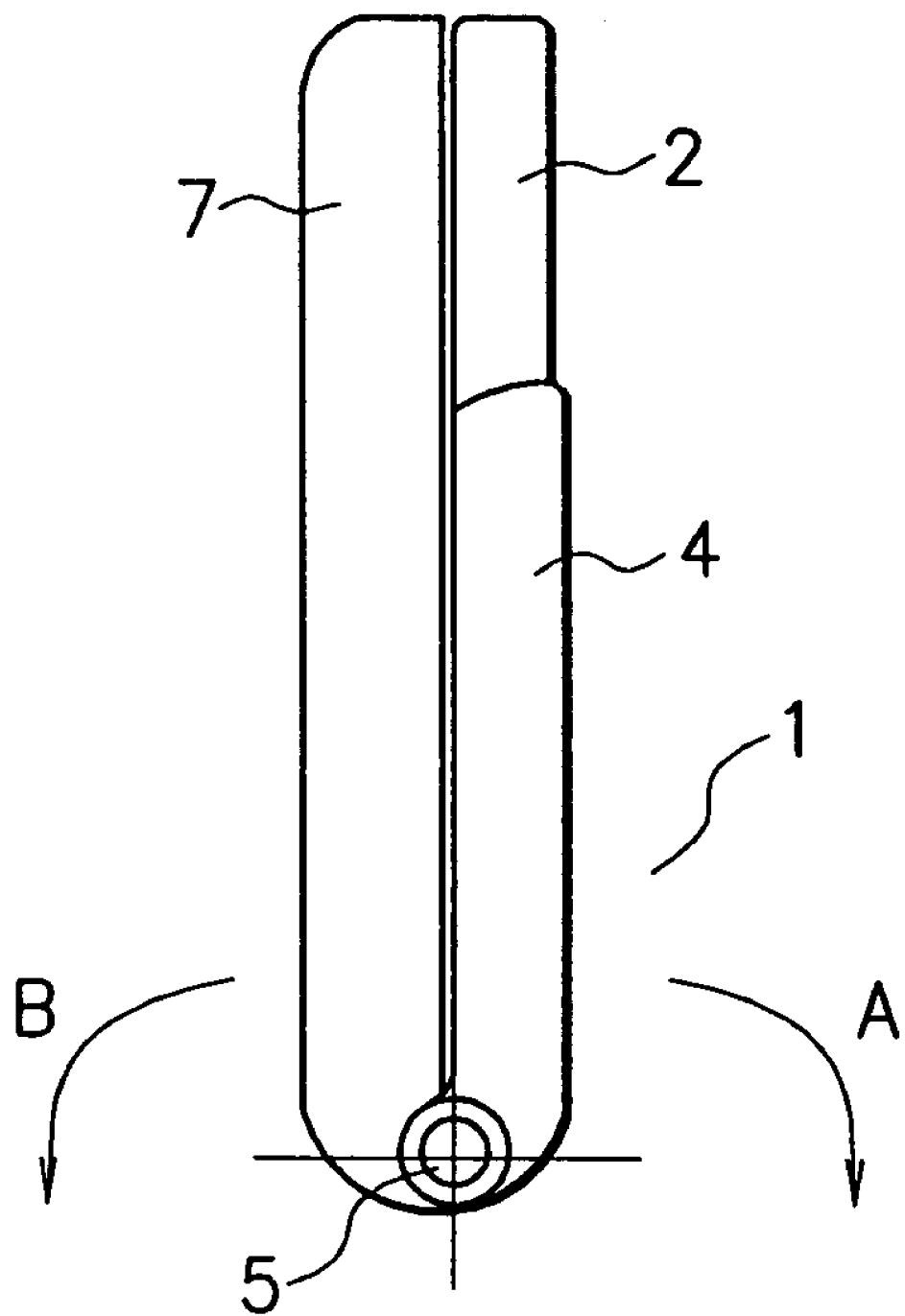
FIG. 2 is a diagram showing a view of the folding cellular telephone depicted in FIG. 1 in the folded state viewed from the left side.
Figure 3:
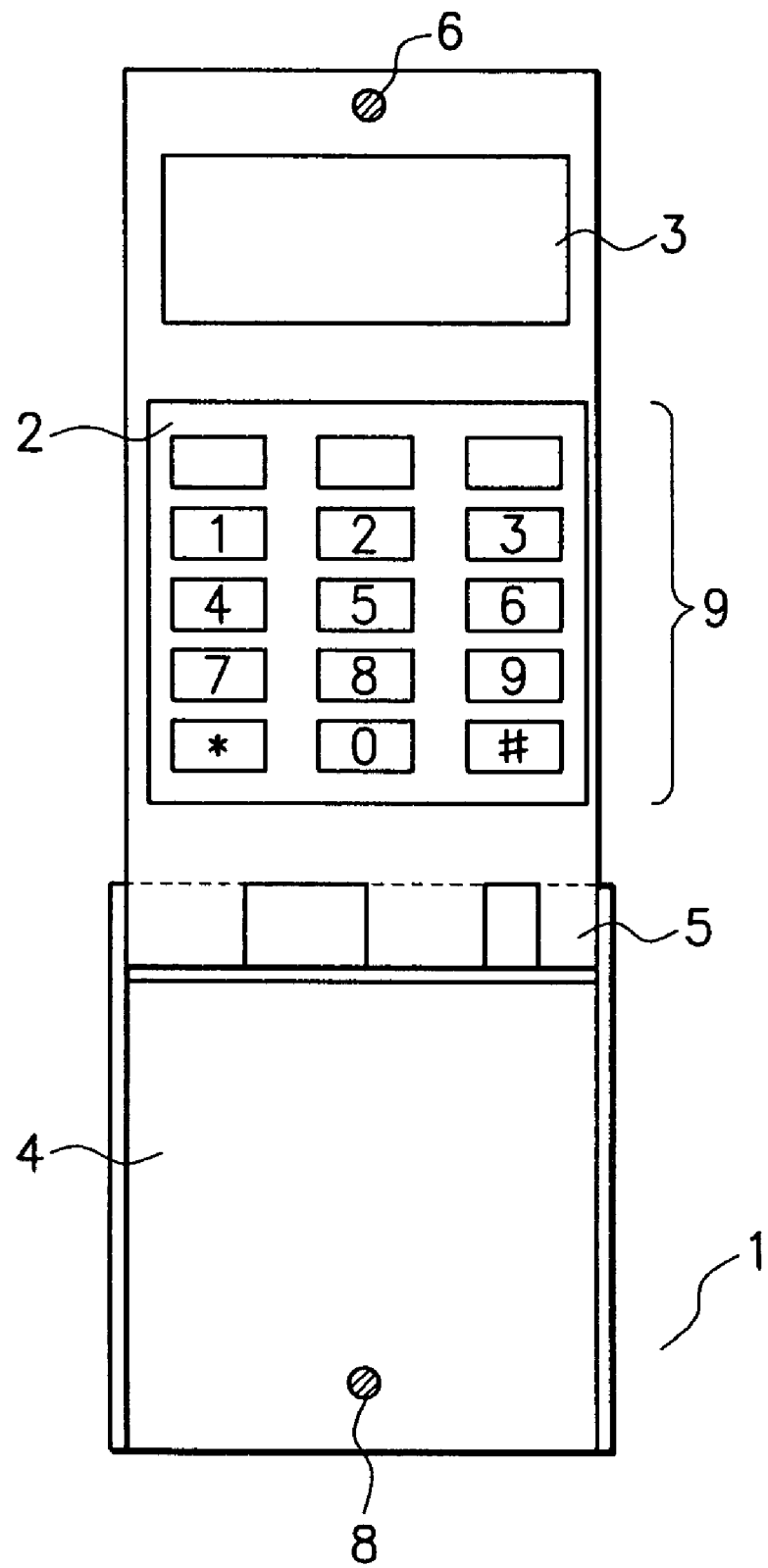
FIG. 3 is a diagram showing a front view of the folding cellular telephone depicted in FIG. 1 in the unfolded state viewed from the side of the small display set on the outer surface of the housing.
Figure 4:
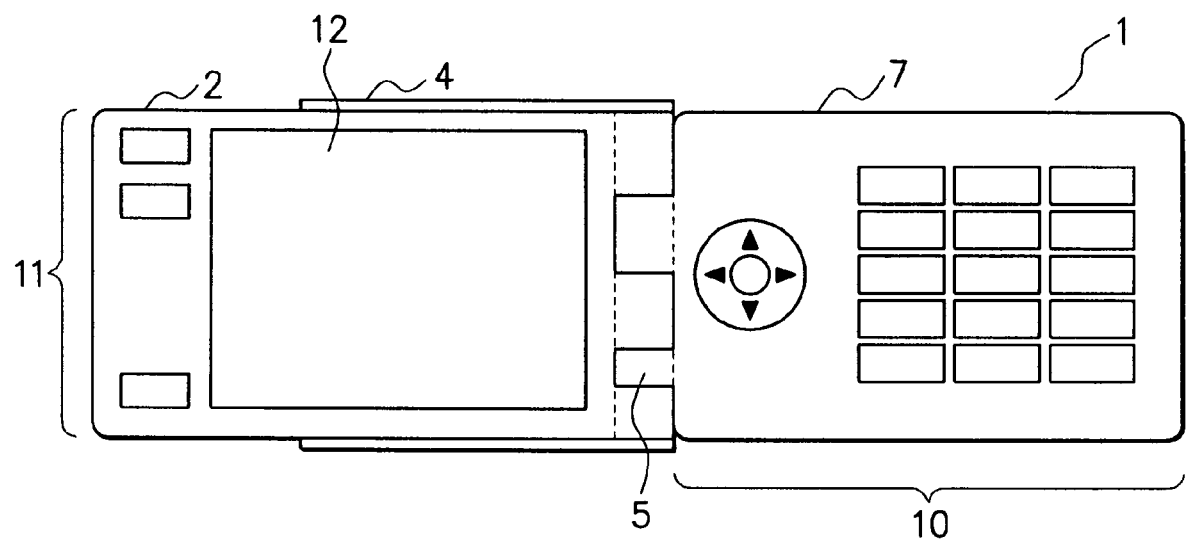
FIG. 4 is a diagram showing a front view of the folding cellular telephone depicted in FIG. 1 in the unfolded state viewed from the side of a large display set on the inner surface of the housing.

FIGS. 1 to 4 are diagrams showing a folding cellular telephone according to the first embodiment of the present invention. FIG. 1 shows a front view of the folding cellular telephone of this embodiment in the folded state viewed from the side of a small display 3 set on the outer surface of a first housing 2. FIG. 2 shows a view of the folding cellular telephone depicted in FIG. 1 in the folded state viewed from the left side. FIG. 3 shows a front view of the folding cellular telephone depicted in FIG. 1 with a cover 4 being open, that is, the cover 4 has been rotated in the direction indicated by the arrow A in FIG. 2 on a hinge section 5 as the axis of rotation, viewed from the side of the small display 3 set on the outer surface of the first housing 2. FIG. 4 shows a front view of the folding cellular telephone depicted in FIG. 1 with a second housing 7 being open, that is, the second housing 7 has been rotated in the direction indicated by the arrow B in FIG. 2 on the hinge section 5 as the axis of rotation, viewed from the side of a large display 12 set on the inner surface of the first housing 2.

In the following, a description will be given of the constituents of the folding cellular telephone according to the first embodiment with reference to FIGS. 1 to 4.

As can be seen in the drawings, the folding cellular telephone 1 comprises a first housing 2, a small display 3, a cover 4, a hinge section 5, a speaker 6, a second housing 7, a microphone 8, first operation keys or buttons 9, second operation keys or buttons 10, third operation keys or buttons 11, and a large display 12.

The first housing 2 is provided with two displays, which are placed on both sides of the housing 2, respectively. The small display 3 is placed on the outer surface of the first housing 2. The cover 4 protects the first operation buttons 9 when they are not in use. The hinge section 5 enables the folding cellular telephone 1 to be folded/unfolded. The second housing 7 is provided with the second operation buttons 10 which are supposedly operated by the right thumb when the folding cellular telephone 1 is unfolded with the hinge section 5 as the axis of rotation. The microphone 8 is incorporated within the cover 4. The first operation buttons 9 are used for making a telephone call. The second operation buttons 10 are supposedly operated by the right thumb. Examples of the second operation buttons 10 include buttons for inputting characters, numerals and symbols, a button for turning on/off power, a cross button (right/left/up/down arrow key) for screen scrolling, and one or more buttons having a specific function such as displaying a menu screen. The third operation buttons 11 are disposed on the first housing 2, and supposedly operated by the left thumb. Examples of the third operation buttons 11 include a button for kana-kanji conversion, and a shift button for inputting a capital or small letter by pressing it together with one of the second operation buttons 10 each having an alphabetic character printed on it. The large display 12 is placed on the inner surface of the first housing 2.

Incidentally, the number of the first to third operation buttons 9, 10 and 11 is not restricted to that shown in FIGS. 3 and 4. Additionally, the functions of the first to third operation buttons 9, 10 and 11 or the inputs provided by pressing them are cited merely by way of example and without limitation.

In the following, a description will be made of the operation of the folding cellular telephone according to the first embodiment.

In the case where the folding cellular telephone 1 is used as a portable radio telephone, the cellular telephone 1 is folded up as shown in FIGS. 1 and 2 while it is in stand-by mode. On this occasion, information such as time is displayed on the small display 3 on the outer surface of the first housing 2. When receiving a telephone call, the telephone number of a calling party is indicated on the small display 3. The user of the folding cellular telephone 1 rotates the cover 4 on the hinge section 5 in the direction indicated by the arrow A to unfold the cellular telephone 1, from folded to unfolded state shown in FIGS. 1 and 3, respectively. Subsequently, the user presses one of the first operation buttons 9 for answering the call, and talks on the folding cellular telephone 1 with the speaker 6 to his/her ear and the microphone 8 to his/her mouth.

In the case where the user makes a telephone call, the folding cellular telephone 1 is unfolded as shown in FIG. 3 from folded state shown in FIG. 1. Then, for example, the user inputs the telephone number of the other party using the first operation buttons 9 while viewing information such as the telephone number displayed on the small display 3, or selects the telephone number of the other party from registered telephone numbers. After that, the user presses one of the first operation buttons 9 for sending a telephone call, and talks on the folding cellular telephone 1 with the speaker 6 to his/her ear and the microphone 8 to his/her mouth as in the case of having received a call. When terminating a conversation, the user presses one of the first operation buttons 9 for clearing the line, and refolds the folding cellular telephone 1 in the state as shown in FIG. 1 from unfolded state shown in FIG. 3.

In the following, a description will be made of the case where the folding cellular telephone 1 is used as an information terminal. As an example, text input will be explained.

On the occasion when the user inputs text, he/she rotates the second housing 7 on the hinge section 5 in the direction indicated by the arrow B to unfold the folding cellular telephone 1, from folded to unfolded state shown in FIGS. 1 and 4, respectively. The user holds the folding cellular telephone 1 transversely, the first housing 2 to his/her left, the second housing 7 to the right. As mentioned above, the first housing 2 has the large display 12 arranged thereon, and the second housing 7 is provided with the second operation buttons 10 which are supposedly operated by the right thumb. Then, the user inputs characters, symbols and the like while viewing information such as text and images displayed on the large display 12.

Generally, input of characters, symbols, etc. is provided by pressing the respective second operation buttons 10 with the right thumb. In the case of entering kanji using kana-kanji conversion or a symbol (special character) which is printed on the surface of no operation button, the user presses one of the third operation buttons 11 for kana-kanji conversion or symbol selection with his/her left thumb repeatedly until a character or symbol desired is displayed on the large display 12. When the character or symbol is displayed or selected, the user presses the input determination button of the second operation buttons 10 to enter it. In the case of entering a capital or small letter of the English alphabet, the user presses one of the second operation buttons 10, which has a desired alphabetic character printed thereon, while holding down the shift button of the third operation buttons 11.

The user operates the cross button of the second operation buttons 10 with his/her right thumb to scroll the content of the display window, such as text and image displayed on the large display 12. When terminating the operation, the user presses the power button of the second operation buttons 10, and refolds the folding cellular telephone 1 in the state as shown in FIG. 1 from unfolded state shown in FIG. 4.

Besides, in the case where the user uses the folding cellular telephone 1 as a portable video game player, he/she also holds the cellular telephone 1 transversely. Thereby, the user can operate the third operation buttons 11 and second operation buttons 10, which are arranged on the first housing 2 and second housing 7, respectively, with his/her thumbs (fingers of both hands). Thus, the operation buttons or keys of the folding cellular telephone 1 can be operated more swiftly and smoothly as compared with those of a conventional cellular telephone.

Figure 5:
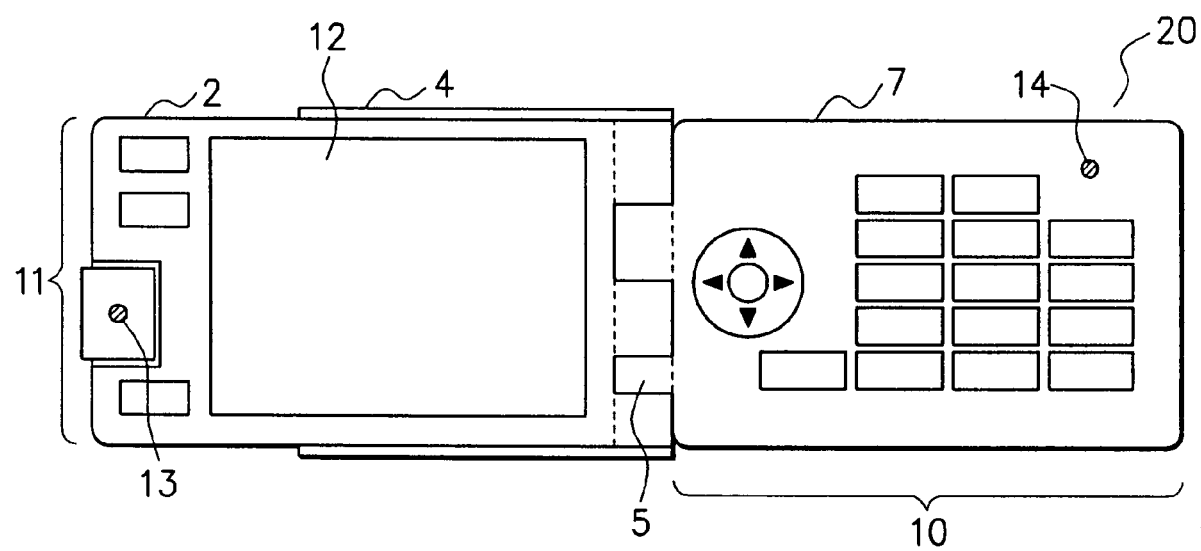
FIG. 5 is a diagram showing a folding cellular telephone according to the second embodiment of the present invention.

FIG. 5 is a diagram showing a folding cellular telephone according to the second embodiment of the present invention. FIG. 5 corresponds to FIG. 4 showing the folding cellular telephone of the first embodiment in the unfolded state.

The folding cellular telephone 20 of this embodiment has essentially the same construction as described previously for that of the first embodiment except for the presence of a rotating speaker 13 and a microphone 14. The rotating speaker 13 is located at the edge of the first housing 2, opposite the side of the hinge section 5 with the large display 12 between them. The microphone 14 is located near the edge of the inner surface of the second housing 7, on the side distant from the hinge section 5. The rotating speaker 13 has a mechanism to turn inward and outward. By virtue of this construction, the folding cellular telephone 20 can be used as a telephone immediately with the second operation buttons 10 and third operation buttons 11 even in the process of being used as an information terminal.

According to the second embodiment, when the rotating speaker 13 faces outwardly, it serves as the speaker 6 of the telephone depicted in FIG. 3, which eliminates the need for the speaker 6 of the first embodiment. Incidentally, the folding cellular telephone 20 may be provided with a second speaker instead of the rotating speaker 13. In this case, the second speaker is arranged on the inner surface of the first housing 2 in back-to-back relation to the speaker 6.

FIG. 6 is a diagram showing a folding cellular telephone according to the third embodiment of the present invention. FIG. 6 corresponds to FIG. 4 showing the folding cellular telephone of the first embodiment in the unfolded state.

The folding cellular telephone 30 of this embodiment has essentially the same construction as described previously for that of the first or second embodiment, except that the cellular telephone 30 further comprises a camera module (digital camera) 15 in the hinge section 5. With this construction, the folding cellular telephone 30 of the third embodiment can be used as, for example, a television or video telephone. That is, the user can talk on the folding cellular telephone 30 while viewing the image of the other party displayed on the large display 12.

Incidentally, in the first to third embodiments described above, the operation buttons for the folding cellular telephone as an information terminal are disposed separately, the second operation buttons 10 being located on the second housing 7, and the third operation buttons 11 being located on the first housing 2. However, all the operation buttons may be placed on the second housing 7. In this case, it is possible to improve the operationality of the folding cellular telephone 30 as a telephone and also reduce electric power consumption with some small sacrifice of the operationality of the cellular telephone 30 used as a portable video game player.

As set forth hereinabove, in accordance with the present invention, the folding cellular telephone, which also functions as an information terminal for sending/receiving e-mail messages, viewing Web sites on the Internet, playing games, and the like, is provided with the cover 4 having only the microphone 8 thereon. The cover 4 is rotated to unfold the folding cellular telephone for the use of the telephone function. The user can make a telephone call by simply pressing the minimum necessary first operation buttons 9. Thus, the folding cellular telephone can be operated easily with only one hand.

Moreover, there is no need to open or rotate the first housing 2 and second housing 7 for the use of the telephone function. Consequently, the large display 12 is not required to perform display operations, and its backlight does not turn on. Thus, electric power consumption can be reduced.

Further, the first operation buttons 9 for the use of the telephone function are located separately from the second operation buttons 10 and third operation buttons 11 used when the folding cellular telephone serves as an information terminal. Therefore, only numerals are printed on the surfaces of the first operation buttons 9 for the telephone function, which makes the buttons easily viewable.

Still further, the operation buttons are divided into the second operation buttons 10 which are supposedly operated by the right thumb and the third operation buttons 11 which are supposedly operated by the left thumb. Accordingly, input of characters, symbols and the like is facilitated. Thus, the user can make a swift input or response to the folding cellular telephone as a portable video game player.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A folding cellular telephone which functions as an information terminal for sending receiving e-mail messages, viewing Web sites on the Internet and playing games, comprising:
   a hinge section formed of a single hinge axis; and
   first and second housing and a cover capable of individual opening and closing movements around the hinge section as the center, said first housing having a small display and first operation keys on a first side thereof, said cover protecting said first operation keys when in a closed position, said first housing further having a large display on a second side opposite said first side, and said second housing having second operation keys on a first side thereof, said first side of said second housing covering said large display when said second housing is in a closed position;
   wherein the telephone function is available when said cover is open; and
   the information terminal function is available when said second housing is open.

2. A folding cellular telephone which functions as an information terminal for sending receiving e-mail messages, viewing Web sites on the Internet and playing games, comprising a first housing, a second housing and a cover, which are connected with each other by a hinge section formed of a single hinge axis so that they can rotate on the hinge axis, wherein:
   first operation keys for using the information terminal function are disposed on one surface of the first housing, on the inside when the folding cellular telephone is folded;
   a large first display section for using the information terminal function is disposed on one surface of the second housing, opposite the surface of the first housing where the first operation keys are disposed when the folding cellular telephone is folded;
   second operation keys, a small second display section, and a speaker for using the telephone function are disposed on the other surface of the second housing in the order named from the vicinity of the hinge section;
   the cover protects the second operation keys disposed on the other surface of the second housing, on the outside when the folding cellular telephone is folded; and
   a microphone is disposed on one surface of the cover, on the inside when the folding cellular telephone is folded.

3. The folding cellular telephone claimed in claim 2, further comprising:
   a second microphone, which is located near the edge of the inner surface of the first housing, on the side distant from the hinge section; and
   a second speaker, which is located at the edge of the inner surface of the second housing, opposite the side of the hinge section, with the first display between the second speaker and the hinge section;
   wherein the telephone function is also accomplished with the first operation keys.

4. The folding cellular telephone claimed in claim 2, further comprising:
   a second microphone, which is located near the edge of the inner surface of the first housing, on the side distant from the hinge section; and
   a rotating speaker, which is located at the edge of the inner surface of the second housing, opposite the side of the hinge section, with the first display between the rotating speaker and the hinge section; wherein:
   the telephone function is also accomplished with the first operation keys; and
   the rotating speaker has a mechanism to turn inward and outward.

5. The folding cellular telephone claimed in claim 2, further comprising:
   a second microphone, which is located near the edge of the inner surface of the first housing, on the side distant from the hinge section;
   a second speaker, which is located at the edge of the inner surface of the second housing, opposite the side of the hinge section, with the first display between the second speaker and the hinge section; and
   a camera module, which is located in the hinge section; wherein:
   the telephone function is also accomplished with the first operation keys; and
   the folding cellular telephone functions as a television telephone while displaying images on the first display.

6. The folding cellular telephone claimed in claim 2, further comprising:
   a second microphone, which is located near the edge of the inner surface of the first housing, on the side distant from the hinge section;
   a rotating speaker, which is located at the edge of the inner surface of the second housing, opposite the side of the hinge section, with the first display between the rotating speaker and the hinge section; and
   a camera module, which is located in the hinge section; wherein:
   the telephone function is also accomplished with the first operation keys;
   the rotating speaker has a mechanism to turn inward and outward; and
   the folding cellular telephone functions as a television telephone while displaying images on the first display.

7. The folding cellular telephone claimed in claim 2, wherein some keys selected from the first operation keys are placed at the edge of the surface of the second housing, opposite the side of the hinge section, with the first display between the keys and the hinge section.

8. The folding cellular telephone claimed in claim 2, further comprising:
   a second microphone, which is located near the edge of the inner surface of the first housing, on the side distant from the hinge section; and
   a second speaker, which is located at the edge of the inner surface of the second housing, opposite the side of the hinge section, with the first display between the second speaker and the hinge section; wherein:
   the telephone function is also accomplished with the first operation keys; and
   some keys selected from the first operation keys are placed at the edge of the surface of the second housing, opposite the side of the hinge section, with the first display between the keys and the hinge section.

9. The folding cellular telephone claimed in claim 2, further comprising:

a second microphone, which is located near the edge of the inner surface of the first housing, on the side distant from the hinge section; and a rotating speaker, which is located at the edge of the inner surface of the second housing, opposite the side of the hinge section, with the first display between the rotating speaker and the hinge section; wherein:

the telephone function is also accomplished with the first operation keys;

the rotating speaker has a mechanism to turn inward and outward; and some keys selected from the first operation keys are placed at the edge of the surface of the second housing, opposite the side of the hinge section, with the first display between the keys and the hinge section.

10. The folding cellular telephone claimed in claim 2, further comprising:

a second microphone, which is located near the edge of the inner surface of the first housing, on the side distant from the hinge section;

a second speaker, which is located at the edge of the inner surface of the second housing, opposite the side of the hinge section, with the first display between the second speaker and the hinge section; and a camera module, which is located in the hinge section; wherein:

the telephone function is also accomplished with the first operation keys;

the folding cellular telephone functions as a television telephone while displaying images on the first display; and some keys selected from the first operation keys are placed at the edge of the surface of the second housing, opposite the side of the hinge section, with the first display between the keys and the hinge section.

11. The folding cellular telephone claimed in claim 2, further comprising:

a second microphone, which is located near the edge of the inner surface of the first housing, on the side distant from the hinge section;

a rotating speaker, which is located at the edge of the inner surface of the second housing, opposite the side of the hinge section, with the first display between the rotating speaker and the hinge section; and a camera module, which is located in the hinge section; wherein:

the telephone function is also accomplished with the first operation keys;

the rotating speaker has a mechanism to turn inward and outward;

the folding cellular telephone functions as a television telephone while displaying images on the first display; and some keys selected from the first operation keys are placed at the edge of the surface of the second housing, opposite the side of the hinge section, with the first display between the keys and the hinge section.

* * * * *